United States Patent [19]

Scopacasa

[11] 3,786,472
[45] Jan. 15, 1974

[54] ELECTRIC LEVEL

[76] Inventor: Frederick L. Scopacasa, 218 Walnut, Newport Beach, Calif. 92660

[22] Filed: Oct. 7, 1971

[21] Appl. No.: 187,464

[52] U.S. Cl.............. 340/282, 200/61.47, 200/224
[51] Int. Cl............................................... G01c 9/06
[58] Field of Search................... 340/282; 307/116; 200/61.47, 61.52, 224, 220

[56] References Cited
UNITED STATES PATENTS

| | | | |
|---|---|---|---|
| 3,204,233 | 8/1965 | Olliff.................................. | 340/282 |
| 2,511,525 | 6/1950 | Bradwell et al..................... | 340/282 |
| 1,982,717 | 12/1934 | Wilhelm.............................. | 200/220 |

Primary Examiner—John W. Caldwell
Assistant Examiner—Glen R. Swann, III
Attorney—George F. Bethel et al.

[57] ABSTRACT

An electrical level for measuring angles of inclination, sensing motion and by a particular embodiment automatically sensing change from horizontal to vertical and vice versa. A chamber, e.g., a toroid, is disposed in a fixed manner with respect to a measuring surface. The chamber is approximately half filled with an electrically conductive liquid, e.g. mercury, and has pairs of electrodes embedded in and spaced around the periphery of the chamber to correspond to the points of liquid contact when the chamber is inclined to predetermined angles. A power means, e.g. a battery, supplies current which passes through the liquid in the chamber to be registered at an appropriate current detecting means, e.g. a light or buzzer, when the liquid contacts an electrode pair. An L-shaped vial containing an electrically conductive liquid and electrode pairs corresponding to points of liquid contact upon inclination to predetermined angles is used in combination with the above chamber to provide automatic sensing of changes between vertical and horizontal, useful to make and break contacts without recourse to a switch.

3 Claims, 6 Drawing Figures

PATENTED JAN 15 1974 3,786,472

INVENTOR.
FREDERICK L. SCOPACASA
BY
GEORGE F. BETHEL
ATTORNEY

3,786,472

INVENTOR.
FREDERICK L. SCOPACASA

BY GEORGE F. BETHEL
ATTORNEY

ELECTRIC LEVEL

FIELD OF THE INVENTION

This invention relates to levels and particularly to an angle or motion sensing electrical level employing an electrically conductive liquid contained in a sealed chamber and the natural tendency of that liquid to remain level independent of a change in position of the chamber.

DESCRIPTION OF THE PRIOR ART

Various devices are available for indicating or checking the level of angle of a slope, elevation or inclination. Generally, these have comprised a transparent, visible tube filled with a liquid and containing a gas bubble which is manually centered between index lines. Frequently, however, the angle or slope to be measured is in a location making it difficult or impossible to view the leveling device. There is no simple, inexpensive, convenient, light-weight portable device which can be used to determine angles of inclination, particularly leveling and changes from horizontal to vertical and back again. The latter device is useful to activate motors and servo mechanisms, to determine attitude of planes, to replace expensive gyroscopes on vessels of all kinds and many other uses where leveling is required. Also, a recent study of earthquakes has concluded that leveling devices might provide the answer to a simple, easily read indication of changes in the angle and movement of the earth over a period of time. Observation of these changes could be particularly useful to predict earthquakes since it has been found that such changes appear to be significantly increased prior to earthquakes.

SUMMARY OF THE INVENTION

The above desirable aspects have now been embodied in a simple, inexpensive, convenient, light-weight portable device which operates solely through the movement of an electrically conductive liquid. The liquid is contained in a suitably sealed chamber, having electrodes embedded therein which correspond to points of contact of the liquid when the chamber is inclined to predetermined angles. Current, supplied for example by a battery, through the chamber electrodes and electrically conductive liquid to be registered by an appropriate current detection device, preferably the illumination of a light. The device is useful for determination of a desired angle either electrically or by physical viewing of the meniscus of the liquid. The latter method is made possible by making the chamber of a transparent material, such as plastic or glass, and providing the electrically conductive liquid with color, if necessary, to provide contrast against the transparent chamber. The chamber is conveniently fixed relative to a measuring surface which preferably is a longitudinal, planar surface adapted to measuring the slope. By a particular preferred embodiment, an additional vial having a substantially L-shape is used in conjunction with the above described chamber. This combination provides automatic sensing, without recourse to manual switching, of changes occurring between the vertical and horizontal.

DESCRIPTION OF THE DRAWINGS

The invention will be more clearly understood by reference to the description below taken in connection with the accompanying drawings wherein.

DESCRIPTION OF THE PREFERRED EMBODIMENTS

Figure 1:
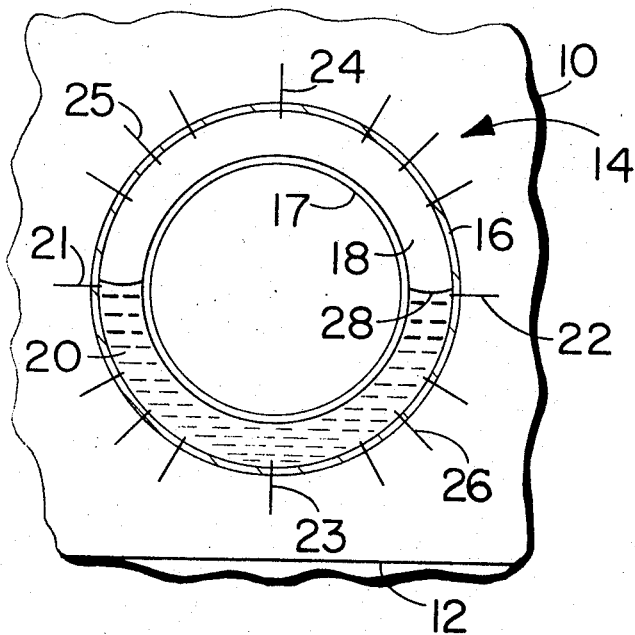
FIG. 1 is a fragmented section showing one chamber embodiment which can be used in the electrical level according to the invention.

Referring now to FIG. 1, there is shown a casing 10 having a measuring surface 12 which is a substantially planar, longitudinal surface. Enclosed within the casing 10 is a toroidal chamber 14 having sides 16 and 17 which enclose a hollow doughnut shaped region 18 within the toroidal chamer 14. An electrically conductive liquid 20 approximately half fills the hollow region 18 enclosed by the sides 16 and 17 of the toroidal chamber 14. Around the periphery of the toroidal chamber 14 are shown a multiplicity of electrode pairs, some of which are indicated by numbers 21-22, 23-24, and 25-26 of which each electrode pair corresponds to the points of liquid contact when the measuring surface 12 is inclined to a predetermined angle. Each of the electrodes 21-26 is embedded in the wall 16 of the toroidal chamber 14 to provide communication with the exterior and interior of the wall 16 for exterior electrical connection, not shown, and interior contact with the electrically conductive liquid 20.

Placement of the electrodes 21-26 around the toroidal chamber can be made in the following manner. When the toroidal chamber 14 containing the electrically conductive liquid 20 is held so that the measuring surface 12 is in the horizontal plane, the meniscus of the electrically conductive liquid 20 contacts the toroidal chamber 14 in a horizontal plane parallel to the plane of the measuring surface. The electrodes are placed in this plane, preferably around the periphery of the toroidal chamber and preferably so that the electrodes are diametrically opposed for ease in making electrical connections. However, any point in the plane is satisfactory. In a similar manner, when the measuring surface 12 is held vertically, the liquid 20 will form a meniscus having points of contact lying in a plane perpendicular to the plane of the measuring surface. Other angles, for example, a 45° angle can be measured in a similar way. In FIG. 1, electrode pair 21-22 indicated a level or horizontal state, electrode pair 23-24 indicates a vertical or 90° slope, and electrode pair 25-26 indicates a 45° slope.

A toroidal chamber is shown in FIG. 1 and is the preferred shape for the chamber 14. A toroid is defined as a surface generated by a circle rotated about a line in its plane that does not intercept the circle. More simply, it is a tube bent into a closed circle. However, other shapes for the chamber can be used, such as for example, spherical, triangular, U-shaped, V-shaped, and cylindrical.

Any material can be used for the chamber 14 which is capable of holding a liquid and is non-conductive. Preferred materials are those which provide transparency to the chamber, such as transparent plastic or glass, so that the meniscus of the liquid can easily be seen. Also, the chamber is preferably sealed to prevent loss of electrically conductive liquid.

Mercury is the preferred electrically conductive liquid to be used, but other conductive liquids, can be used such as, for example, aqueous electrolyte solutions comprised of water and wherein the electrolyte comprises KOH, NaOH, NaCl, and $H_2SO_4$. Other electrically conductive liquids are known which are equivalent to the above mentioned materials and will be obvious to those skilled in the art. If desired, color can be added to the above liquids to provide contrast against the transparent material of the chamber.

Preferably, the electrically conductive liquid fills substantially half of the volume of the chamber. However, lesser or greater amounts of liquid can be used, as long as there is a meniscus defining a plane intersecting the chamber.

The measuring surface 12 is preferably a substantially planar, longitudinal surface adapted to be applied to a slope. Preferably, also the chamber is fixed relative to the measuring surface and extends longitudinally and perpendicularly thereof as shown in FIG. 1.

Figure 2:
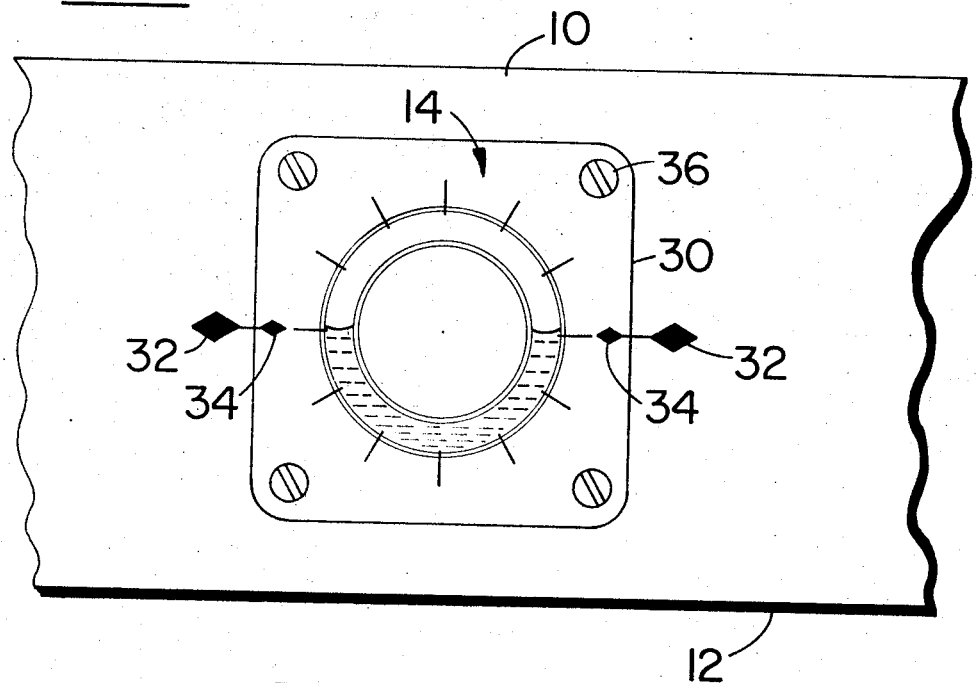
FIG. 2 shows a fragmented section of the chamber of FIG. 1 mounted in a holder.

In FIG. 2, the toroidal chamber 14 of FIG. 1 is shown mounted in a holder 30. By manufacturing the chamber 14 in a holder, at least two objectives will be accomplished. First, the toroidal chamber 14 will be less susceptible to breaking since the holder 30 will offer some protection. Second, if a toroidal chamber becomes inoperative due to breakage of the chamber itself or of the electrodes, only the chamber need be replaced or repaired. A new toroidal chamber 14 with associated holder 30 can be purchased and mounted into the original casing 10. A pair of holder indicators 34 can be aligned with casing indicators 32 during replacement of the holder 30. The holder 30 can be conveniently retained in a fixed position within the casing 10 by the use of screws 36.

Figure 3:
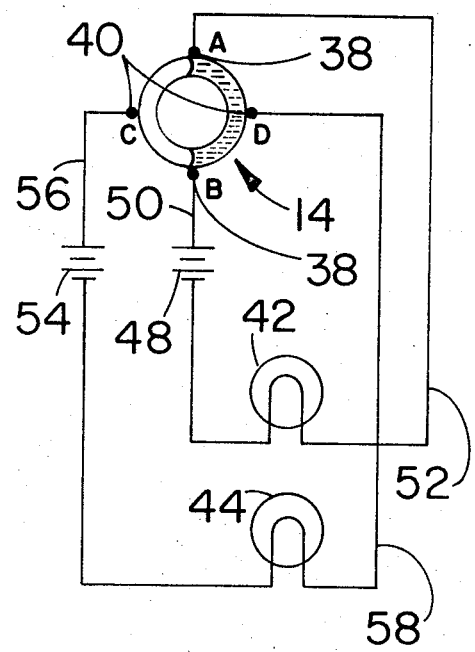
FIG. 3 is a schematic representation of an embodiment of the invention using a separate battery-light combination for each angle to be indicated.

In FIG. 3, a multiplicity of electrode pairs are represented by an A-B electrode pair 38 and a C-D electrode pair 40. Electrode pair 38 is comprised of an A electrode and a B electrode which are diametrically opposed 180° on the toroidal chamber 14. Similarly, the C-D electrode pair is comprised of a C electrode and a D electrode that are diametrically opposed 90° from the A and B electrodes. Each electrode passes through the wall 16 into the hollow region 18 of the toroidal chamber 14. In this manner, the conductive liquid 20 which is contained within the hollow region 18 can come into contact with each electrode in the electrode pairs 38 and 40.

A pair of lights 42 and 44 are shown in an electrical circuit that is external to the toroidal chamber 14. A battery 48 is shown in series with the light 42. This battery/light combination is connected across the A-B electrode pair 38. An external battery lead 50 is connected to the A electrode. Similarly, a battery 54 is connected to the light 44. That battery/light combination is connected across the C-D electrode pair 40. The external battery lead 56 is connected to the C electrode and an external light lead 58 is connected to the D electrode.

With the structure of this embodiment thus described, the operation thereof is readily apparent. When the conductive liquid 20 is in a position so that both the C electrode and the D electrode are in simultaneous contact with the conductive liquid 20, current from battery 54 will flow through the external battery lead 56, the C electrode, the conductive liquid 20, the D electrode, the external light lead 58, and the light 44. This condition can be sensed by lamp 44 lighting when the current flows through the circuit. If the toroidal chamber 14 is in such a position that the conducting liquid 20 is in simultaneous contact with the A-B electrode pair 38, current from battery 48 will similarly pass through the A-B electrode pair 38 and the light 42 to provide an indication of a position of the conductive liquid 20 within the toroidal chamber 14.

It is apparent that any number of electrode pairs can be mounted within the toroidal chamber 14 and connected in a battery/light combination to provide a visual light sensing indication for other positions of the conductive liquid 20 within the toroidal chamber 14.

Figure 4:
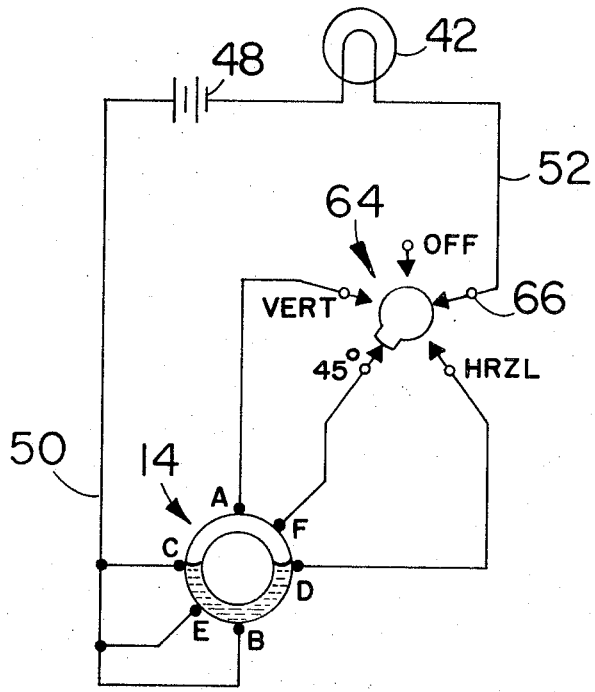
FIG. 4 is a schematic representation of an embodiment of the invention similar to FIG. 3 except that a switch is used to connect the appropriate electrode pair corresponding to the desired angle to be indicated; and, FIGS. 5 and 6 show a schematic representation of a toroidal chamber used in combination with an L-shaped vial to provide indication of vertical and horizontal positions automatically.

In FIG. 4, a single light 42 is connected in series with a battery 48 and a multi-poled switch 64. The multi-poled switch 64 has a throw pole 66 and a plurality of receiving poles marked OFF, VERT (vertical), 45°, HRZL (horizontal) which connect an appropriate electrode pair for the angle indicated. The external light terminal 52 is connected to the throw pole 66. The A, F, and D electrodes are each connected to one of the receiving poles 68 on the multi-pole switch 64. External battery lead 50 of battery 48 is connected to the C,E, and B electrodes respectively.

In this embodiment the user of the electrical level can set the multi-pole switch 64 at the angle to be measured. For example, if he desires to measure an angle of 45° with respect to the horizontal, he merely turns the switch to the receiving pole 68 which is marked 45°. Then, when the measuring surface 12 is inclined at a 45° angle with the horizontal, the conducting liquid 20 will contact the E-F electrode pair and close the external electrical circuit, thereby lighting lamp 42.

Figure 5:
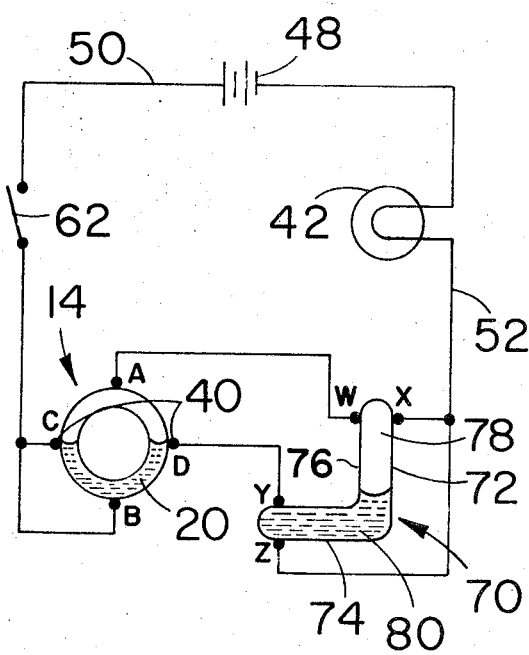
Figure 6:
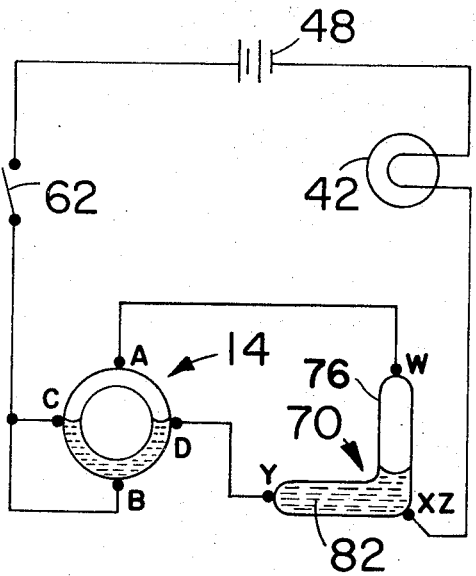

FIGS. 5 and 6 show an electrical leveling system for automatic sensing of changes between vertical and horizontal and vice versa. In FIG. 5, lamp 42 is connected to battery 48 through an L-shaped vial 70, a toroidal chamber 14 and a switch 62. The toroidal chamber 14 has a pair of electrodes C-D corresponding to the vertical position. The L-shaped vial 70 has a first leg 72, a second leg 74, and sides 76 which enclose a hollow region 78. At the end of the first leg 72 is a W-X electrode pair, and at the end of the second leg 74 is a Y-Z electrode pair.

In this embodiment, the lamp 42 is connected in series with the battery 48 through electrode pairs in both the toroidal chamber 14 and L-shaped vial 70. External battery terminal 50 is connected through switch 62 to the B and C electrodes of the toroidal chamber. The A-electrode in the toroidal chamber 14 is connected to the W electrode in the L-shaped vial 70; and the D electrode in the toroidal chamber 14 is connected to the Y electrode in the L-shaped vial 70. The X and Z electrodes in the L-shaped vial 70 are connected to the lamp 42 through external lamp lead 52.

From this brief discussion of the circuitry of this embodiment, the operation thereof can be readily understood. When a horizontal angle is being measured, the electrically conductive liquid 20 in the toroidal chamber 14 will be in contact with the C-D electrode pair. In the L-shaped vial 70, the electrically conductive liquid 80 will be in contact with the Y-Z electrode pair. This permits passage of current from the battery 48 along external battery lead 50 through closed switch 62 to the toroidal chamber 14. Here current passes through the C electrode, the electrically conductive liquid 20, and electrode D to the L-shaped vial, where it passes through the Y electrode, electrically conductive liquid 80, the Z electrode, along external light lead 52 to illuminate light 42.

When a vertical angle is being measured, the current passes from the battery 48 as above described to the toroidal chamber 14 where it passes through the B electrode, through the liquid 20, A electrode, to the W electrode of the L-shaped vial, through the liquid 80, X electrode to illuminate lamp 42.

While the above discussion explains how the above embodiment operates, the advantages thereof may not be readily apparent.

Referring now to FIG. 5, it can be seen that as the toroidal chamber 14 is inclined, for example, from the horizontal position, where electrode pair C-D is being contacted, by the liquid 20, to the vertical position where the A-B electrode pair is contacted that several electrodes are being contacted by the liquid 20. At a point, for example, where the meniscus of the liquid 20 has points of contact lying between electrodes C and B and between electrodes A and D, current will pass from the B electrode through the liquid 20 to the D electrode, even though this does not correspond to a horizontal or vertical position.

In order to close the circuit, the current must pass then from the D electrode through the Y-Z electrode pair in the L-shaped vial 70. However, the liquid 80 in the L-shaped vial 70 will not contact Y-Z pair unless the system is in the horizontal position. Similarly, when the C-electrode and the A electrode in the toroidal chamber 14 are contacted, current will pass through these two electrodes even though a horizontal or vertical position is not present. However, the circuit cannot be closed unless the liquid 80 in the L-shaped vial 70 contacts the W-X electrode pair and this does not take place except when the system is in the vertical position. Thus, the combination of the toroidal chamber 14 and the L-shaped vial 70 provides automatic sensing, without error, of changes between the hoizontal and vertical positions. Without the L-shaped vial 70, a false reading would be obtained in inclining the toroidal chamber 14 around from the horizontal to the vertical positions. Thus, the system avoids the need for a switch which would require manual operation in any event. Automatic sensing provided by the above described system could find many applications where electrical contacts could be made or broken when a change took place between horizontal and vertical or vice versa.

Fig. 6 shows a slightly different embodiment when that shown in FIG. 5. The primary difference lies in the fact that there is a common XZ electrode located in the elbow 82 of the vial 70 and is connected to the light 42. Operation of the system is the same as in FIG. 5 except that the XZ electrode replaces the separate X and Z electrodes of the L-shaped vial 70 of FIG. 5. In the horizontal position the Y-XZ electrode pair is contacted by the electrically conductive liquid 80, and in the vertical position the W-XZ electrode pair is contacted.

Regarding the L-shaped vial, the identity of the electrically conductive liquid 80 and the material of which the vial is composed would be the same as discussed for the chamber 14.

The invention thus shown and described provides a simple, easily read, electrical level. By a particular embodiment, the chamber 14 set in a holder is conveniently removed for repair or replacement. While the drawing shows only the preferred toroidal chamber and L-shaped vial, other shapes will be apparent to those skilled in the art. Also in place of the light, an audio signal can be used. Other embodiments and modifications can be utilized under the teachings of this invention. Thus, the full scope and breadth of this invention is only to be read in light of the following claims.

I claim:

1. An electrical level for measuring angles of inclination and sensing motion comprising in combination:

a measuring surface;

said measuring surface comprising a substantially planar longitudinal surface adapted to be applied against a slope to be measured;

a chamber;

said chamber being fixed relative to said measuring surface, and being comprised of a non-conductive material;

one or more electrode pairs embedded in the walls of said chamber and communicating with the exterior and interior regions defined by said chamber;

each of said electrode pairs lying substantially in a plane intersecting said chamber and whereby said intersecting plane forms an angle relative to the plane of said measuring surface;

power means and current detecting means connected across each of said electrode pairs;

an electrically conductive liquid contained by and partially filling said chamber so that when said measuring surface is inclined at a predetermined angle, said liquid contacts one of said electrode pairs permitting passage of current from said power means through said liquid by means of said electrodes to be registered by said current detecting means;

a substantially L-shaped hollow tubular, substantially sealed vial of a non-conductive material having a first leg disposed perpendicularly to said measuring surface and a second leg disposed longitudinally to said measuring surface;

an electrically conductive liquid contained by and substantially filling one leg of said vial;

one or more electrode pairs embedded in the walls of said L-shaped vial and communicating with the exterior and interior regions defined by said vial;

each of said vial electrode pairs lying substantially in a plane intersecting said vial and whereby said intersecting plane forms an angle relative to the plane of said measuring surface so that said electrically conductive liquid in said vial contacts one of said electrode pairs when said electrical level is inclined to a predetermined angle; and, each of said vial electrode pairs further being series connected to said power means through an electrode pair of said chamber and also being series connected to said current detecting means so that when said measuring surface is inclined at a predetermined angle said liquid in said chamber and said liquid in said vial simultaneously contact a pair of electrodes in said chamber and a pair of electrodes in said vial permitting passage of current from said power means through said chamber by means of the electrodes and liquid contained therein, then through said vial by means of the electrodes and liquid contained therein to be registered by said current detecting means.

2. An electrical level according to claim 1 wherein:

said chamber is toroidal in shape and said chamber and vial are comprised of transparent plastic;

said chamber further being mounted to said measuring surface so that the axis of rotation of said toroidal chamber is substantially perpendicular to the plane of said measuring surface and wherein said chamber extends longitudinally with respect to said measuring surface;

wherein said liquid in said vial and chamber is mercury and substantially half fills said vial and chamber respectively;

said chamber electrode pairs being diametrically spaced from each other and include a first electrode pair having an A electrode and a B electrode lying along the axis of rotation of said toroidal chamber and in a plane substantially perpendicular to the plane of said measuring surface, and a second electrode pair having a C electrode and a D electrode lying along its axis of rotation and in a plane substantially parallel to said measuring surface;

said vial electrode pairs being diametrically spaced from each other and include a first electrode pair having a W electrode and an X electrode in said first leg and a second electrode pair having an X electrode and a Z electrode in said second leg;

said power means is a battery which is connected to the C and B electrodes in said toroidal chamber;

said current detecting means comprises at least one light series connected to said battery through said chamber electrode pairs and through said vial electrode pairs according to claim 1;

said A electrode in said toroidal chamber is connected to the W electrode in said L-shaped vial;

said D electrode in said toroidal chamber is connected to the Y electrode in said L-shaped vial; and, said X and Z electrodes in said L-shaped vial are connected to said light.

3. An electrical level according to claim 1 wherein:

said electrically conductive liquid is an aqueous electrolyte solution;

said vial and chamber are formed of glass; and, said current detecting means comprises an audio signal.

* * * * *